(12) United States Patent
Watton et al.

(10) Patent No.: US 6,736,201 B2
(45) Date of Patent: May 18, 2004

(54) HEAT EXCHANGER AND/OR FLUID MIXING MEANS

(75) Inventors: Brian Keith Watton, Albrighton (GB); Keith Thomas Symonds, Codsall (GB); Steven Paul Symonds, Codsall (GB)

(73) Assignee: Chart Heat Exchangers Limited, Cardiff (GB)

( * ) Notice: Subject to any disclaimer, the term of this patent is extended or adjusted under 35 U.S.C. 154(b) by 0 days.

(21) Appl. No.: 10/309,210

(22) Filed: Dec. 4, 2002

(65) Prior Publication Data

US 2003/0079870 A1 May 1, 2003

Related U.S. Application Data (62) Division of application No. 09/445,150, filed as application No. PCT/GB98/01565 on May 28, 1998, now Pat. No. 6,510,894.

(30) Foreign Application Priority Data

| Jun. 3, 1997 | (GB) | 9711429 |
| Nov. 20, 1997 | (GB) | 9724538 |

(51) Int. Cl.[7] .................................................. F28F 3/00
(52) U.S. Cl. ..................... 165/166; 165/167; 165/174; 165/178
(58) Field of Search .............................. 165/166, 167, 165/174, 178, 175

(56) References Cited

U.S. PATENT DOCUMENTS

| 3,983,191 A | 9/1976 | Schauls |
| 4,214,867 A | 7/1980 | Hunter et al. |
| 4,516,632 A | 5/1985 | Swift et al. |
| 4,880,055 A | 11/1989 | Niggemann et al. |
| 5,212,004 A | 5/1993 | Bottcher et al. |
| 5,611,214 A | 3/1997 | Wegeng et al. |
| 5,690,763 A | 11/1997 | Ashmead et al. |
| 5,811,062 A | 9/1998 | Wegeng et al. |
| 5,857,517 A | 1/1999 | Grenier et al. |
| 6,129,973 A | 10/2000 | Martin et al. |

FOREIGN PATENT DOCUMENTS

| DE | 195 28 116 A | 2/1997 |
| EP | 0 724 127 A | 7/1996 |
| GB | 691967 | 5/1953 |
| GB | 868244 | 5/1961 |
| GB | 1 329 177 | 9/1973 |
| GB | 1 484 124 | 8/1977 |
| GB | 2 093 582 | 9/1982 |
| GB | 2 251 679 | 7/1992 |
| GB | 2 303 911 | 3/1997 |
| GB | 2 305 721 | 4/1997 |
| JP | 60 256 794 | 12/1985 |
| WO | WO 96/34421 | 10/1996 |

Primary Examiner—Christopher Atkinson
(74) Attorney, Agent, or Firm—Pillsbury Winthrop LLP (57) ABSTRACT

The invention provides an improved heat exchanger and/or fluid mixing means which comprises a bonded stack of plates, the stack comprising at least one group of main perforated plates, wherein at least two adjacent plates of the group of main perforated plates have their perforations aligned in rows with continuous ribs between adjacent rows, and the adjacent plates are aligned whereby the rows of perforations in one plate overlap in the direction of the rows with the rows of perforations of an adjacent plate and the ribs of adjacent plates lie in correspondence with each other to provide discrete fluid channels extending across the plates, a channel corresponding to each row of perforations, the channels together forming one or more fluid passageways across the plates and the passageway(s) in the group of main perforated plates being separated from passageway(s) in any adjacent group of perforated plates by an intervening plate.

8 Claims, 9 Drawing Sheets

HEAT EXCHANGER AND/OR FLUID MIXING MEANS

This is a Division of U.S. application Ser. No. 09/445,150 filed on Dec. 3, 1999 U.S. Pat. No. 6,510,894, which is a U.S. national phase of PCT/GB98/01565 filed on May 28, 1998, which claims priority from Great Britain Application Nos. 9711429.2 filed Jun. 3, 1997 and 9724538.5 filed Nov. 20, 1997, each of which is hereby incorporated by reference herein in its entirety.

FIELD OF THE INVENTION

This invention relates to a compact heat exchanger and/or fluid mixing means which incorporates a series of plates having apertures which define a plurality of passages through which fluid may flow.

BACKGROUND AND SUMMARY

Compact heat exchangers are characterised by their high "area density" which means that they have a high ratio of heat transfer surface to heat exchanger volume. Area density is typically greater than 300 $m^2/m^3$. and may be more than 700 $m^2/m^3$. Such heat exchangers are typically used to cool (or heat) process fluids.

One well known but expensive to manufacture type of heat exchanger is the so-called tube and shell heat exchanger. Essentially such heat exchangers consist of an exterior tubular shell through which run a number of longitudinally-extending smaller diameter tubes carrying one or more fluids. Other fluids, with which heat is to be exchanged, typically pass transversely across the heat exchanger such that heat is exchanged through the tube walls. A large number of tubes may be needed and they each have to be individually and accurately fixed/secured into a header plate at each end of the shell. In each case holes need to be drilled in the header plates very accurately to locate the tubes. High quality tested tubing then needs to be assembled into the plates and brazed or welded or mechanically-expanded into position. As the tubes are reduced in diameter to increase surfaces available for heat transfer and hence performance/compactness, the more difficult and expensive such configurations become to manufacture.

A second known type of heat exchanger is the so-called primary plate/secondary plate type exchanger in which a stack of plates is assembled; the stack having primary plates which directly separate two different fluid streams and secondary plates between adjacent primary plates. The secondary plates act as fins which add to the strength of structure and may be provided with perforations to provide additional flow paths for the fluids. The plates are usually bonded together by brazing but this may have the disadvantage of affecting the physical properties of the plates in the brazed regions or may introduce into the system, by means of the braze material, a potentially less satisfactory structure in terms of strength and corrosion resistance. It has been proposed to bond the plates together by diffusion bonding but a satisfactory construction that can withstand the high pressures involved has not been achieved and the fins may buckle during the bonding process.

It is an object of the present invention to provide an improved construction of this second type of heat exchanger which can be satisfactorily made by, for example, diffusion bonding or by brazing. It also aims to provide a heat exchanger construction which can also be readily adapted for use as a fluid mixing means, e.g. it can be used as a chemical reactor in which fluids which are to react together are mixed. Thus, where a reaction is exothermic, the invention may provide a means whereby the exothermic heat of reaction may be removed efficiently or, alternatively, it may be used to supply heat to an endothermic reaction. The products of the invention are also useful as fuel reformers and gas clean-up units associated with fuel cell technology.

Accordingly, the present invention provides a heat exchanger or fluid mixing means comprising a bonded stack of plates, the stack comprising at least one group of main perforated plates, wherein at least two adjacent plates of the group of main perforated plates have their perforations aligned in rows with continuous ribs between adjacent rows and the adjacent plates are aligned whereby the rows of perforations in one plate overlap in the direction of the rows with the rows of perforations of an adjacent plate and the ribs of adjacent plates lie in correspondence with each other to provide discrete fluid channels extending across the plates, a channel corresponding to each row of perforations, the channels together forming one or more fluid passageways across the plates and the passageway(s) in the group of main perforated plates, being separated from passageway(s) in any adjacent group of perforated plates by an intervening plate.

The intervening plate may be unperforated to provide complete separation of the passageways of the respective groups of plates. Such an intervening plate will be referred to below as a "separator plate". Alternatively, as is described in more detail below, the intervening plate may contain holes positioned and sized to provide controlled mixing of the fluids in those passageways. Such an intervening plate will be referred to below as a mixing plate.

Each group of main perforated plates comprises at least two perforated plates but may contain three or more adjacent perforated plates as desired. A stack may, for example, comprise two or more groups of main perforated plates separated by intervening plates, each group containing two perforated plates having their perforations aligned in rows.

The passageways formed by the rows of discrete channels across the plates may simply traverse across the plates one from one side to the other. However, in a first specific embodiment, the perforations at one or both ends of each row are shaped to turn their respective channels through an angle whereby the passageway defined by the channels continues in a different direction through the stack.

In a second specific embodiment two or more separate passageways are provided across a group of plates whereby streams of different fluids may flow parallel to each other in the same layer prolided by said group of plates. This embodiment can provide improved temperature profiles across the plates and reduced thermal stress.

Because the plates are stacked with the main perforated plates of each group aligned with their perforations in parallel rows, it will be appreciated that the solid regions (i.e. ribs) of those plates between the rows of perforations are also aligned in parallel rows. As the perforated plates, therefore, are stacked one above each others the parallel ribs are aligned through the stack and hence this not only provides the discrete channels referred to above, it provides strength through the assembled stack whereby the pressures generated in the bonding process can be withstood. The invention, therefore, provides a stack structure that can be bonded without the risk of the fins of the secondary plates collapsing under the pressures generated. The fins also provide the means of withstanding internal pressures in the operating streams.

The perforations may be of any desired shape but are preferably elongated slots. In the aforementioned first embodiment the slots at the end of a row are preferably "L" or "V" shaped with the angle of the "V" being determined by the desired change of direction of the passageway.

The plates may be rectangular, square or circular for example or of any other preferred shape.

Where the plates are square or rectangular, each row of slots may extend from a first edge of the plate parallel to a second edge of the plate and for substantially the whole length of that second edge. It will be appreciated that a substantially unperforated edge or border will normally be required around the perimeter of the major faces of the plate to enable the plates of the stack to be bonded together and to provide pressure containment for the stream or streams. However, a completely unperforated border is not essential and slots in the border may be required for inlet and outlet means, for example. A plurality of rows of slots may, therefore, extend across the plate from the first edge towards the opposite, third, edge. In respect of the first embodiment described above, adjacent that opposite third edge the slots at the end of the row may be "L" shaped whereby each row then extends at right angles to its original direction, i.e. extends parallel to the third edge. A second right angle turn may then be arranged whereby the rows of slots then extend back across the plate parallel to the first plurality of rows and so on.

Depending on the number and width of the rows in each plurality of rows and on the width of the plate, this change of direction can be repeated several times across the plate. Thus a passageway defined by at least a pair of perforated plates may extend backwards and forwards across the plates, i.e. a multi-pass arrangement.

Where the plates are circular the rows and passageways may extend from the outer perimeter as a segment of the circle towards the centre and then turn through an angle "α" to extend back towards the perimeter and so on. The rows and passageways (and hence the slots) can narrow as they get closer to the centre and the number of segments and hence turns will, of course, be determined by α°, e.g. where α°=45°, there will be eight segments.

In one particular arrangement of the aforesaid second embodiment, a stack may be built up of one or more similar groups of plates, each group comprising an upper and a lower unperforated, or primary plate, a multipassageway input layer in contact with one primary plate and a corresponding multi-passageway output layer in contact with the other primary plate, a centrally-disposed layer having at least one passageway for a first fluid and two or more transfer passageways for a fluid from each passageway of the input layer, a first auxiliary perforated plate lying between the input layer and the centrally-disposed layer and a second auxiliary perforated plate lying between the output layer and the centrally-disposed layer, the perforations in the first auxiliary perforated plate being positioned to transfer fluid from each passageway of the input layer to the corresponding transfer passageways in the centrally-disposed layer and the perforations in the second auxiliary perforated plate being positioned to transfer fluid from the transfer passageways to the corresponding passageways of the output layer. The centrally-disposed layer can conveniently be formed of a plurality of main perforated plates as described above, as can the input and output layers.

The perforations or slots are preferably photochemically etched through the plates by known means, although spark erosion, punching or any other suitable means may be used, if desired.

It will be appreciated that the slots in one plate of the group of main perforated plates must not correspond directly with those of its stacked adjacent main perforated plate or plates so that the non-perforated regions of the two plates do not completely coincide but must only overlap so that the flow channels defined by the plates of the group are not blocked. Thus, if as is preferred, some or all of the plates of a group are identical, they must be positioned relative to each other with an overlap at one edge so that the transverse solid regions or bars between adjacent slots of a row do not coincide and thereby form a barrier to flow along the channel. It will also be appreciated that the spacing of the transverse bars affects the heat transfer performance as the fluid(s) are constrained to flow over or under the bars. Thus the plates may be designed to enhance heat transfer without excessive pressure drop.

Each of the plurality of fluid channels forming an individual passageway may pass through the stack without any communication with another channel of the passageway. No mixing of fluid in those channels can, therefore, take place and the stack functions purely as a heat exchanger with fluids at different temperatures passing through different groups of perforated plates or passing through different passageways in the same group of perforated plates.

In another embodiment there is provided intercommunication at selected positions between the channels of a passageway. Thus cross-channels or vents may be etched or otherwise formed in the plates to provide access between adjacent channels. The vents may be formed at any desired position along the flow channels. Thus fluids flowing through separate channels may be mixed at pre-arranged positions on their journey through the passageways through the stack and this mixing may be employed to improve heat exchange capability.

Alternatively or additionally, inlets for a further fluid may be provided through the peripheral borders of the plates. Thus reactant may be introduced and mixed via the peripheral border inlets whereby the stack may be employed as a chemical reactor.

In another embodiment the invention provides a stack in which a fluid stream from one group of main perforated plates may be injected into a fluid stream in an adjacent group of main plates. Injection holes for this purpose are provided in an intervening mixing plate which separates the two groups of main perforated plates. So-called "process intensification" can be achieved by this means, and any reaction caused by the injection of a first fluid into a second fluid can be controlled by the pressure differential between the two streams, the size, numbers and spacing of the injection holes and by sandwiching the second stream between the first stream and a coolant or heating stream, as appropriate.

The density of the slots, and hence of the ribs br fins between each row of slots, may be varied, as required. Thus the number of slots per unit width or per unit length of a plate may be arranged to suit any particular flow/pressure drop/distribution change requirements.

The rows of slots may extend linearly across the plate but this is not essential and they may be arranged in other desired patterns, e.g. herringbone or chevron.

The plates may be provided at their edges with extensions, e.g. in the form of lugs to assist location of the plates in a stack. Such lugs may be designed to be broken off after the stack has been assembled, e.g. by etching partway through their thickness along a line where the lug joins the plate. Alternatively the extensions may fit together in the stack to provide, e.g. one or more tanks on the side faces of the stack. Each extension may, for example, be in the form of a flat loop, e.g. of semi-circular profile, providing an aperture at the edge of the plate, the apertures of adjacent plates forming the volume of the tank when the plates are stacked together. The loops may be attached to the plate not only at their ends but also across the aperture by means of narrow ligaments. The tanks so formed can each feed fluid, e.g. process fluid, coolant or reactant which is fed into the tanks, into the channels of one passageway. Thus a tank will be coterminous on the side of the stack with the height and width of the passageway, i.e. a group of channels, to be fed. Where the stacks are polygonal in plan, a tank may be provided on one or more of the side faces of the stack. Where the stacks are circular in plan, a number of tanks may be spaced around the perimeter as desired.

As indicated above, the stacks of the invention are particularly well adapted to provide multi-stream and multi-pass operation.

Plates used to form the products of the invention may also be provided with a hole, e.g. disposed centrally through each plate, whereby a stack of the plates has a centrally-disposed discrete passageway for a fluid stream through the stack. To compensate for the loss of flow area where such a central hole is provided, it is possible, where a plate is provided with integral tank loops, to extend the plate outwardly between adjacent loops.

The plates of a stack are preferably of the same material and are preferably thin sheets of metal, e.g. of 0.5 mm thickness or less. The material is preferably stainless steel but other metals, e.g. aluminium, copper or titanium or alloys thereof, may be used.

Inlet and outlet headers or manifolds for the different fluids may be secured to the stack after bonding together of the stack plates or, alternatively, may be formed from integral features on the plates.

As indicated above, the components of a stack may be bonded together by diffusion bonding or by brazing. Diffusion bonding, where possible, may be preferred but, in the case of aluminum, which is difficult to diffusion bond, brazing may be necessary. It is then preferable to clad the aluminium surfaces, e.g. by hot-roll pressure bonding, with a suitable brazing alloy, in order to achieve satisfactory bonding by the brazing technique, although other means to provide the braze medium may be used, e.g. foil or vapour deposition.

The invention is particularly useful where it is desired to build up a large heat exchanger by bonding side by side a number of heat exchanger units. Each unit can be provided by a stack of plates of the invention. Each stack may, for illustration purposes only, be formed of plates of, say, 300 mm width by 1200 mm length and of the desired height depending on the thickness and number of plates. Several stacks can be placed side by side on a separator plate and then the assembly closed at the top by another separator plate. If six stacks, for example, are utilised side by side, a heat exchanger of about 1800 mm length is achieved. All required lugs, mitre sections, spacers, etc. can be formed integrally and built up from appropriate formations on each plate and all the stacks will be of the same height, being made up of identical plates. Such an arrangement has significant advantages in the manufacture of, for example, "cryogenic" aluminium heat exchangers, which conventionally have to be built up of layers of corrugations with separate side bars. Unless the height of the side bars relative to the height of the corrugations is correct lack of uniformity and unsatisfactory brazing of the product may result.

BRIEF DESCRIPTION OF THE DRAWINGS

Embodiments of the invention will now be described by way of example only with reference to the accompanying drawings in which.

DETAILED DESCRIPTION

Figure 1:
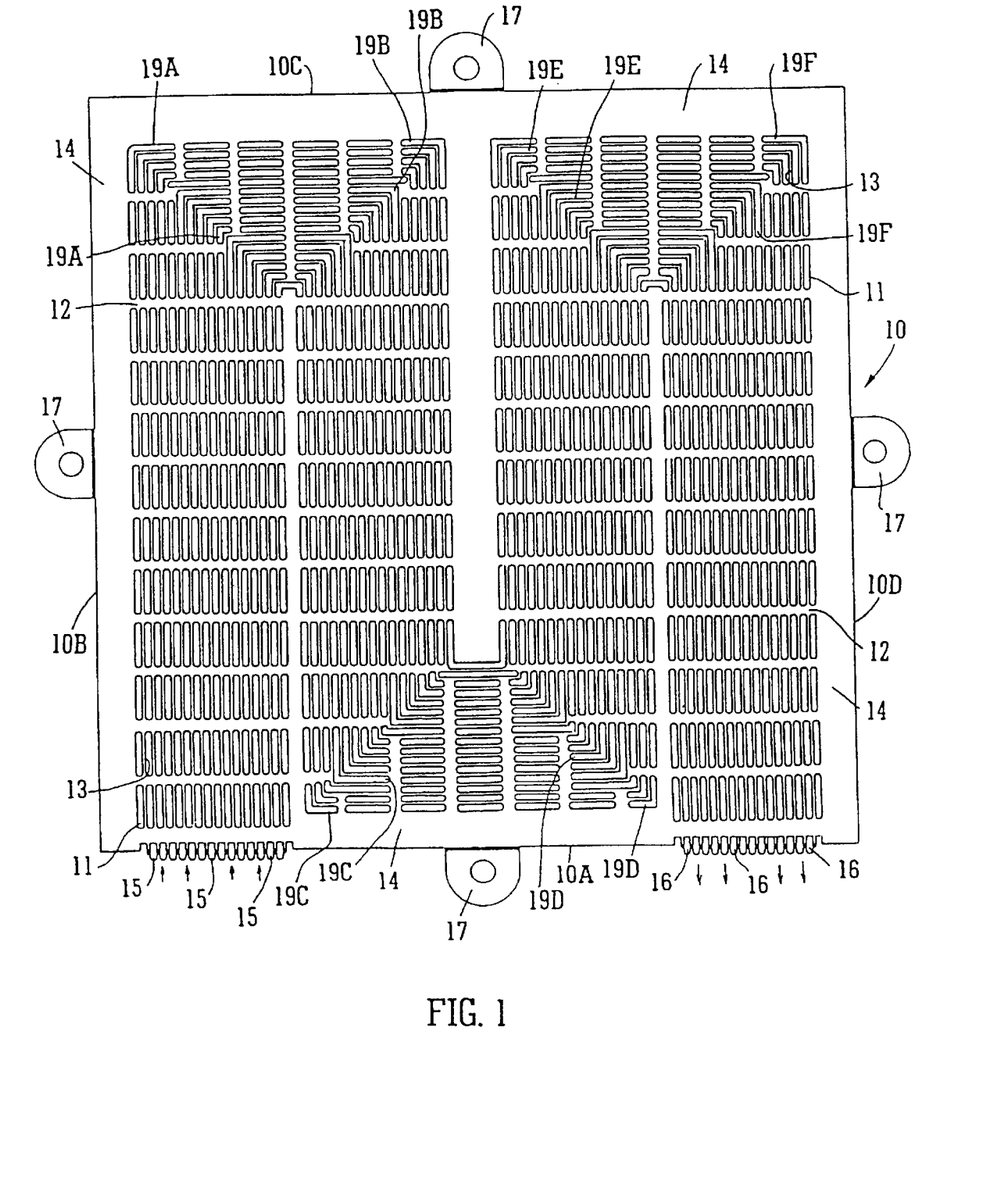
FIG. 1 is a plan view of one form of main, perforated plate for use in the invention.

In FIG. 1, a main perforated plate 10 for use in the invention is of rectangular shape, having four edges 10A, 10B, 10C, 10D. It has a series of perforations in the form of elongated slots 11 through its thickness. The slots 11 lie in parallel rows forming four main groups of rows extending across the plate between edges 10A and 10C. As shown there are 16 rows of slots in each group of rows but it will be appreciated that more or less rows of slots per group (and more or less groups across the plate) may be employed, if desired.

Transverse bars or flow interrupters 12 separate each slot from adjacent slots in the same row. (It will be appreciated that bars 12, which are shown normally across the plate, could if desired be angled.) Narrow fins or ribs 13 extending in the direction of the slots separate each slot in a row from a slot in an adjacent row.

An unperforated border region 14 extends around the whole of edges 10B, 10C, 10D of the plate. The central portion of edge 10A is also unperforated, but groups of edge slots 15 and 16 corresponding to the first and fourth groups of slots perforate the remainder of edge 10A.

Positioning lugs 17 are integrally-formed at the mid-region of each edge 10A, 10B, 10C, 10D.

As the rows of slots 11 of the first group approach the border 14 at edge 10C, an L-shaped slot 19A turns its row through a right angle so that the row which ran parallel to edge 10B now continues parallel to side 10C. A second L-shaped slot 19B then turns each row through a second right angle so that the rows, now forming the second group of rows, continue back across the plate parallel to edge 10B. This pattern is repeated when the second group of rows of slots approaches the border at edge 10A, with L-shaped slots 19C turning the rows to continue parallel to edge 10A and then L-shaped slots 19D turning the rows again to run parallel to edge 10D.

Finally, when the rows approach the border at edge 10C again, they are turned by L-shaped slots 19E to run parallel to edge 10C and then edge shaped slots 19F to run parallel to edge 10D.

When a pair of plates 10 is superposed one on the other so that they overlap by a small amount at their edges 10A (and IOC) but with their edges 10B and 10D aligned, the transverse bars 12 of one plate will be sufficiently out of alignment with those of the other plate so as not to overlap therewith. Flow channels are, thereby, provided along the rows of slots as the transverse bars do not prevent flow. Because the fins or ribs 13 of the superposed plates are aligned, each row of slots provides a discrete flow channel separated from adjacent flow channels.

Thus when the superposed pair of plates is bonded between a pair of unperforated plates, a group of independent, discrete flow channels will form a passageway which crosses and re-crosses four times through the stack so formed. Fluid can, therefore, enter the stack in the direction of the arrows at edge slots 15 and after four passes across the stack, leave in the direction of the arrows at edge slots 16.

Because the fins are aligned, the stack may be bonded in the border regions of the plates 10 by diffusion bonding, without risk of fin collapse.

It will be appreciated that a stack will comprise at least two groups of pairs of superposed plates, each group being divided from an adjacent group by an unperforated plate. Different fluids can then pass through each group to effect a desired heat exchange.

It will also be appreciated that there may be more than two perforated plates in each group.

Figure 2:
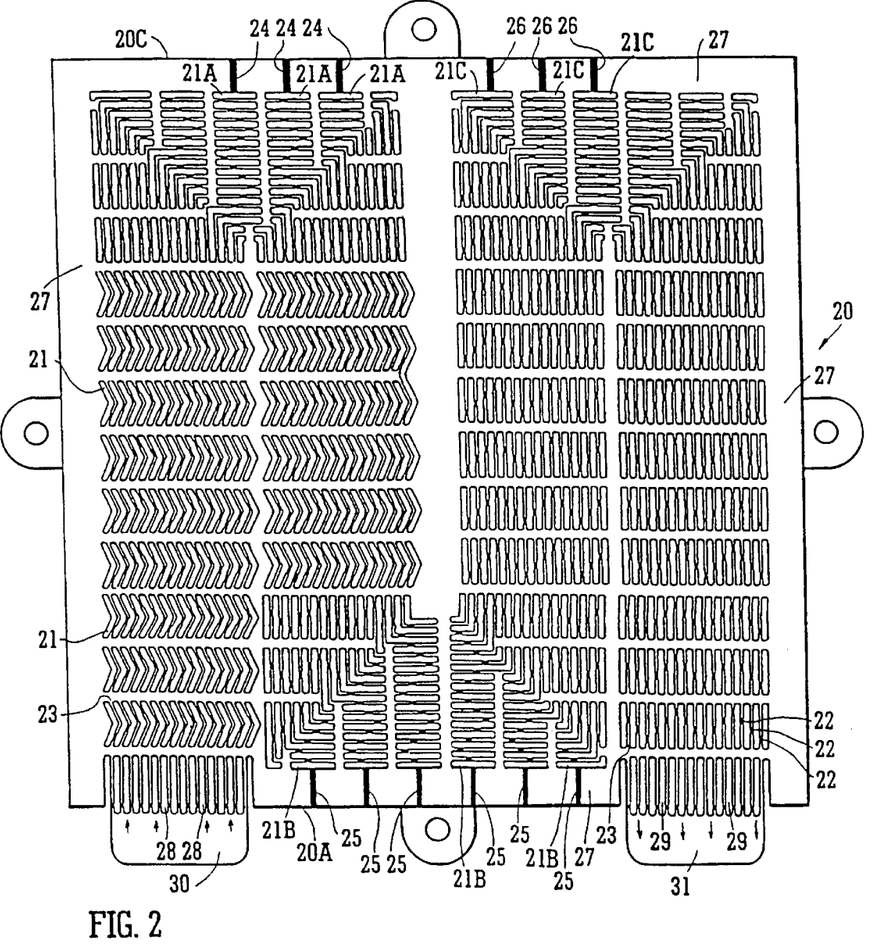
FIG. 2 is a plan view of a second form of main, perforated plate with cross-channel vents for use in the invention.

In FIG. 2 is shown an alternative form of plate 20 for use in the invention. Plate 20 has a basically similar construction to plate 10 of FIG. 1 to provide a four-pass arrangement but slots 21 in the first and second groups of slots are chevron, shaped rather than linearly elongate, thereby providing a herringbone pattern of passageways in the first two passes of passes of fluid through a stack containing pairs of plates 20.

The plate 20 has cross-channel vents 22 through the ribs or fins 23 which separate each slot in a row from a slot in an adjacent row. These vents enable mixing of the fluid to take place at predetermined positions between the otherwise discrete, independent flow channels that are formed when two or more plates 20 are stacked together.

Figures 2A, 2B:
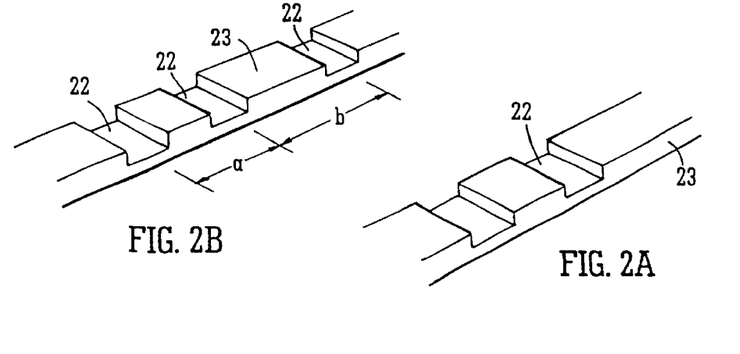
FIG. 2A is an enlarged perspective view of a portion of a rib between the slot perforations of the plate of FIG. 2.
FIG. 2B is a similar view to FIG. 2A showing a variation in the spacing of the cross-channel vents.

The vents 22 are shown at regular repeating intervals in FIG. 2 and are shown in larger scale in FIG. 2A where a portion of a fin 23 is shown. The vents may be formed by etching through, for example, about half of the rib thickness.

The size and positioning of the vents can be adjusted to suit the particular requirements and as shown in FIG. 2B, the pitch a or b of the vents may be variable, if desired. For example, it may be desirable to change the pitch of the vents at the approach to the L-shaped slots.

Plate 20 also has groups of injection ports 24, 25 and 26 positioned to inject a second and, if desired, third and fourth fluids respectively into a process fluid passing through a stack containing at least a pair of plates 20. Injection ports 24 communicate into a row of slots 21A parallel to edge 20C of the plate through border region 27 of the plate. Injection ports 25 similarly communicate into a row of slots 21B parallel to edge 20A of the plate and injection ports 26 communicate into a second row of slots 21C parallel to edge 20C.

Process fluid enters at a first group of slots 28 at edge 20A in the direction of the arrows and makes a first pass across a stack towards edge 20B where it is turned at right angles to run parallel to edge 20C. A second fluid can then be injected through ports 24 prior to the fluids then being turned again at right angles to travel back to edge 20A where further fluid which may be the second or a third fluid can be injected through ports 25. The fluids are turned again to travel back towards edge 20C where they are again turned and further fluid injected through ports 26 before the fluids are finally turned to travel again to edge 20A where they exit through slots 29 again in the direction of the arrows.

As shown in FIG. 2 entry slots 28 and exit slots 29 are formed attached to integrally-formed opening tabs 30 and 31 respectively. These tabs are formed with a weakness, e.g. are etched half-way through their thickness, so that they can be broken off after the desired stack has been formed.

Thus using plates as shown in FIG. 2, two or more fluids may be mixed via the injection ports and the cross-channel vents. The injection ports 24 were so positioned to allow any initial turbulence of the fluid entering the stack to subside before injection of the second fluid. Injection ports 25 are positioned to allow any heat of reaction caused by the injection of the second fluid to be dissipated by a cooling fluid in adjacent plate passageways before further fluid is injected. Similarly ports 26 are positioned to allow heat dissipation to take place after injection at ports 25 before further injection takes place.

It can be seen, therefore, that the invention can provide a heat exchanger/mixer/reactor in which so-called process intensification can be effectively utilised, i.e. the stack of the invention cart be used to control and dissipate the heat produced in an exothermic chemical reaction. It can be used to maintain a more constant reaction temperature at the optimum temperature. It can be used to put in heat, if needed to start a reaction and then to dissipate heat when the heat of reaction builds up. Thus the dangers of conventional mixing tanks, i.e. over-beating, and the inconvenience of having to mix small amounts of reactants, hold, stir and then inject further small amounts can be obviated in much more energy efficient manner.

Figure 3:
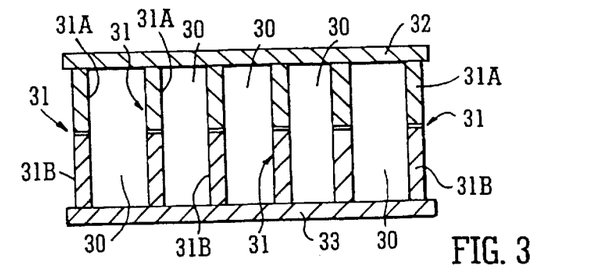
FIG. 3 is a section through one group of channels formed between a pair of adjacent main perforated plates.

In FIG. 3 is shown a group of channels 30 formed by ribs or fins 31 extending across the flow path of a fluid between two unperforated plates 32, 33. The ribs 31 are formed by the juxtaposition of ribs 31A and 31B of two perforated plates. As shown the pitch of the ribs increases going transversely from right to left across the flow channels.

It will be appreciated that the slots in the rows and hence the elongation of the fins may also vary along the length of the rows so that a wide variety of longitudinal and transverse pitch variation is possible.

Figure 4:
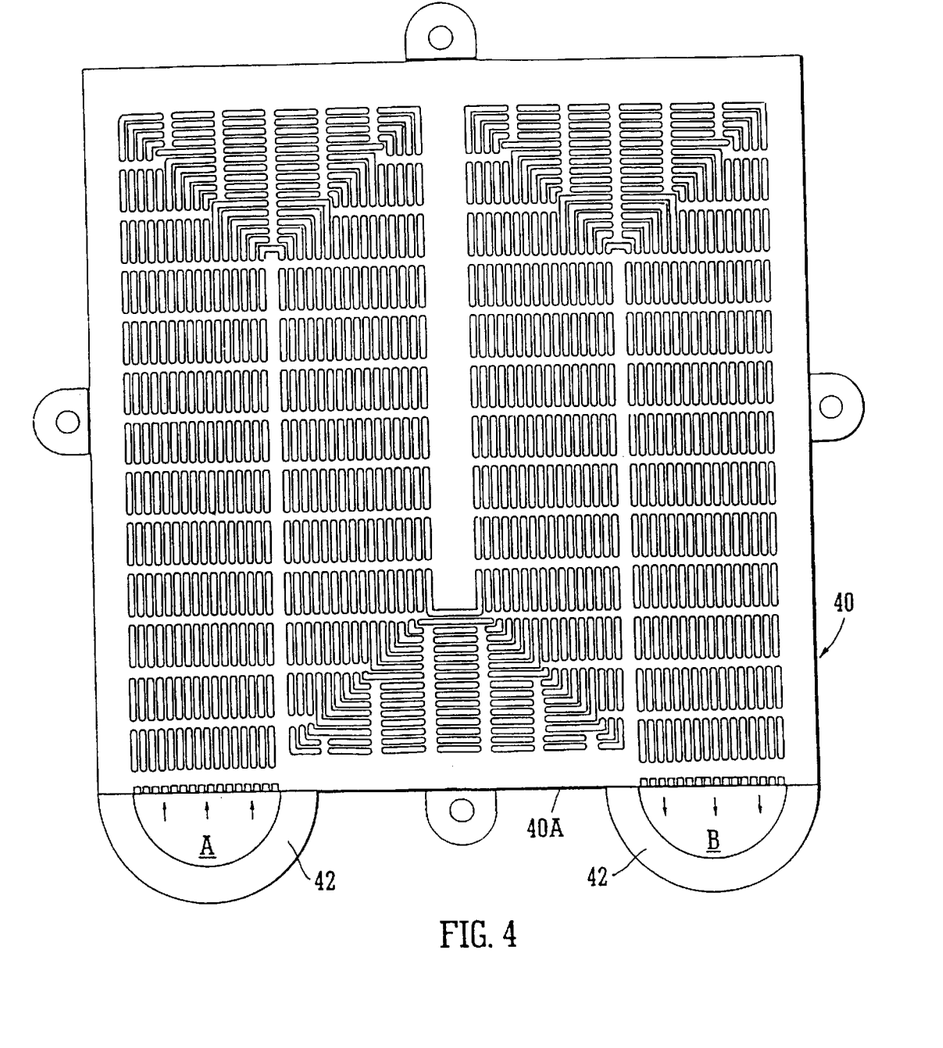
FIG. 4 is a plan view of a third form of main perforated plate of the invention having integral means for the formation of tanks.

In FIG. 4 a plate 40 has a construction similar to that of FIG. 1 with essentially the same arrangement of slots, ribs, bars and borders. On edge 40A of the plate, through which fluid can inlet in the direction of arrows A and exit in the direction of arrows B, is provided a pair of integrally-formed loops 41 and 42. Loop 41 surrounds and encloses the inlet region A and loop 42 surrounds and encloses the outlet region B. When a plurality of plates 40 are stacked together to form the desired fluid channels and passageways, loops 41 stack together and loops 42 stack together to form two integral tanks which are co-extensive with the inlet and outlet regions and through which the inlet region can be fed and into which the outlet can feed. The tanks can be fitted with fluid supply and removal means in the conventional manner. It will be appreciated that where intervening plates are used, they too must have integral loops corresponding to those shown in FIG. 4.

Figure 5:
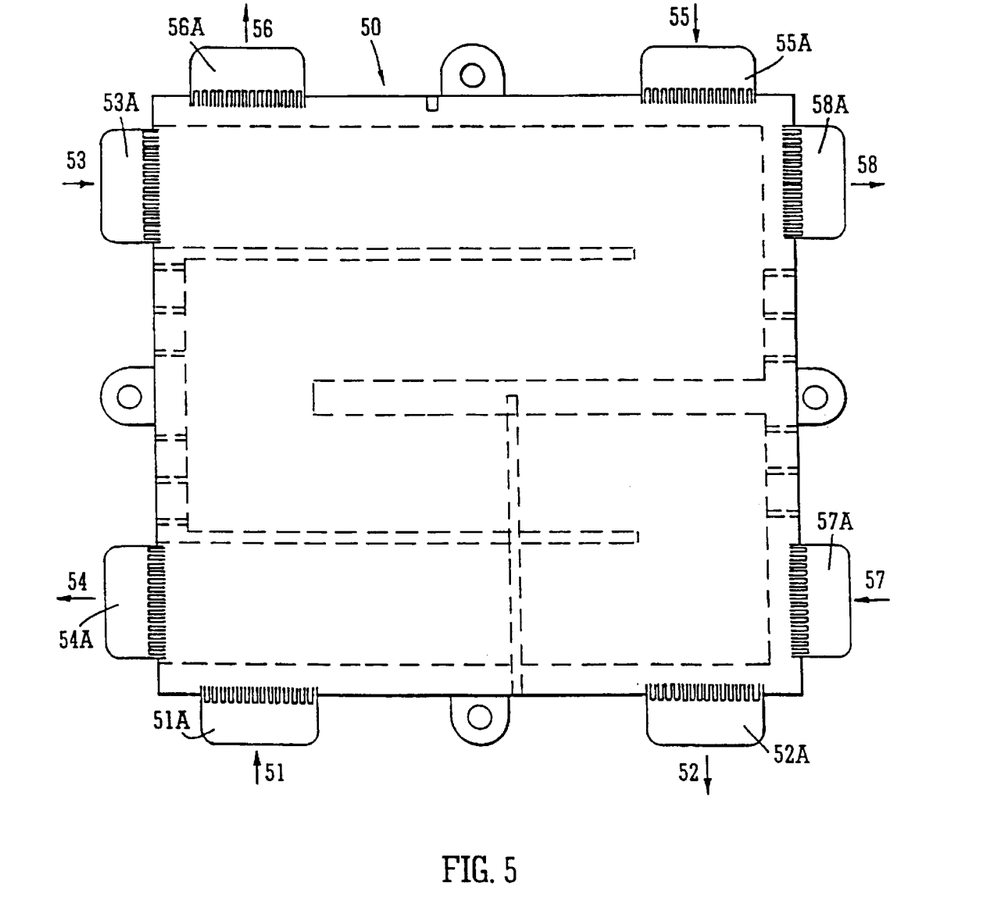
FIG. 5 is a diagrammatic illustration in plan of a stack of the invention having a multi-passageway and multi-pass construction.

In FIG. 5 is shown a stack 50 having four groups of perforated plates providing four separate passageways through the stack. Each group contains an identical array of perforated plates, beings at least one pair of superposed plates similar to those shown in FIG. 1 or 2, i.e. each group provides a four-pass passageway through the plate for its fluid, i.e. the stack is a four-stream, four-pass arrangement.

As shown the first group of plates has an inlet at 51 and an outlet at 52 for the first stream. The second group has an inlet at 53 and an outlet at 54 for the second stream. The third group has an inlet at 55 and an outlet at 56 for the third stream. The fourth group has an inlet at 57 and outlet at 58 for the fourth stream.

An opening tab, shown before being broken off, can be seen for the inlet and outlet of each group, i.e. for each passageway through the stack. Tabs 51A and 52A; 53A and 54A; 55A and 516A; 57A and 58A correspond to the inlets and outlets respectively of the same reference number.

As can be seen from the tabs, each group of plates is rotated through 90° clockwise in the stack relative to the group beneath it to achieve the desired construction.

Figure 6A:
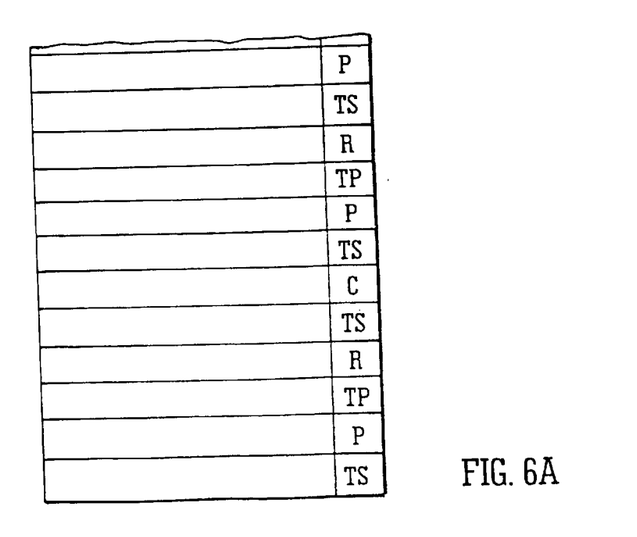
FIG. 6A is a diagrammatic illustration of a stack of plates according to the invention for use as a chemical reactor.

In FIG. 6A is shown a stack of plates particularly suitable for use as a chemical reactor. The plates used to make the stack are shown in FIGS. 6B to 6F.

Figure 6B:
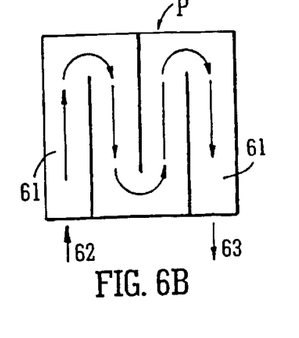
FIGS. 6B to 6F are diagrammatic plan views of the individual types of plates making up the stack of FIG. 6A.

In FIG. 6B plate P represents a group of at least two perforated plates having the rows of slots required for the present invention. As shown, the group has a passageway 61 defining a four-pass arrangement between inlet 62 and outlet 63. Process fluid will pass through this group of plates in the stack of FIG. 6A.

Figure 6C:
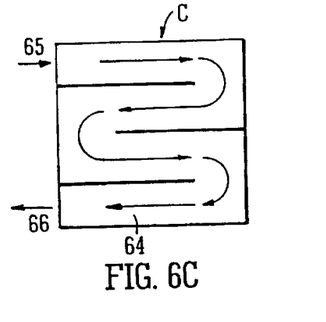

In FIG. 6C is shown a group of plates C having a passageway 64 defining a four-pass arrangement between inlet 65 and, outlet 66. Coolant will pass through this group of plates in the stack of FIG. 6A and plates C will be, as shown, rotated clockwise through 90° relative to plates P.

Figure 6D:
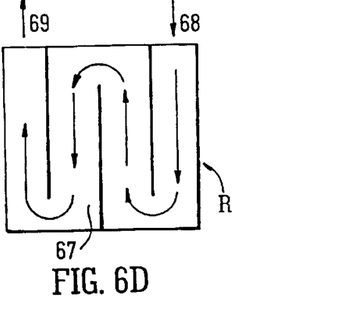

FIG. 6D is a group of plates R similar to group P. Again, this group has a passageway 67 defining a four-pass arrangement between an inlet 68 and an outlet 69. Reactant will pass through this group of plates in the stack of FIG. 6A. As shown, plates R are rotated clockwise through 90° relative to plates C and 180° relative to plates P.

Figure 6E:
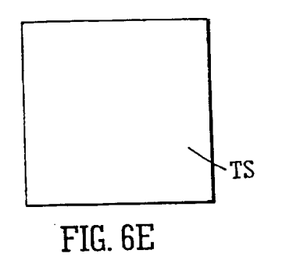

FIG. 6E shows a single, unperforated intervening separator plate TS.

Figure 6F:
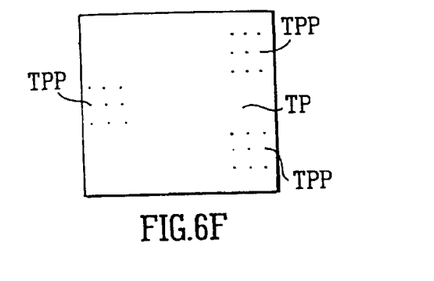

FIG. 6F shows a single intervening, mixing plate TP. Plate TP has groups of circular holes TPP through its thickness, although holes of other shapes may be used, if desired.

The plates or groups of plates are assembled and bonded into a stack in the order shown in FIG. 6A. It will be noted that the stack repeats in the sequence TS-P-TP-R-TS-C-TS-P and so on. Thus the reactant and process layers are separated by the mixing plate TP whereby the reactant can be mixed into the process layer at the predetermined positions governed by the positions of the groups of holes TPP and in amounts governed by fluid pressure and the size and number of the holes. Coolant fluid passes between adjacent pairs of unperfoated plates TS.

Figure 7:
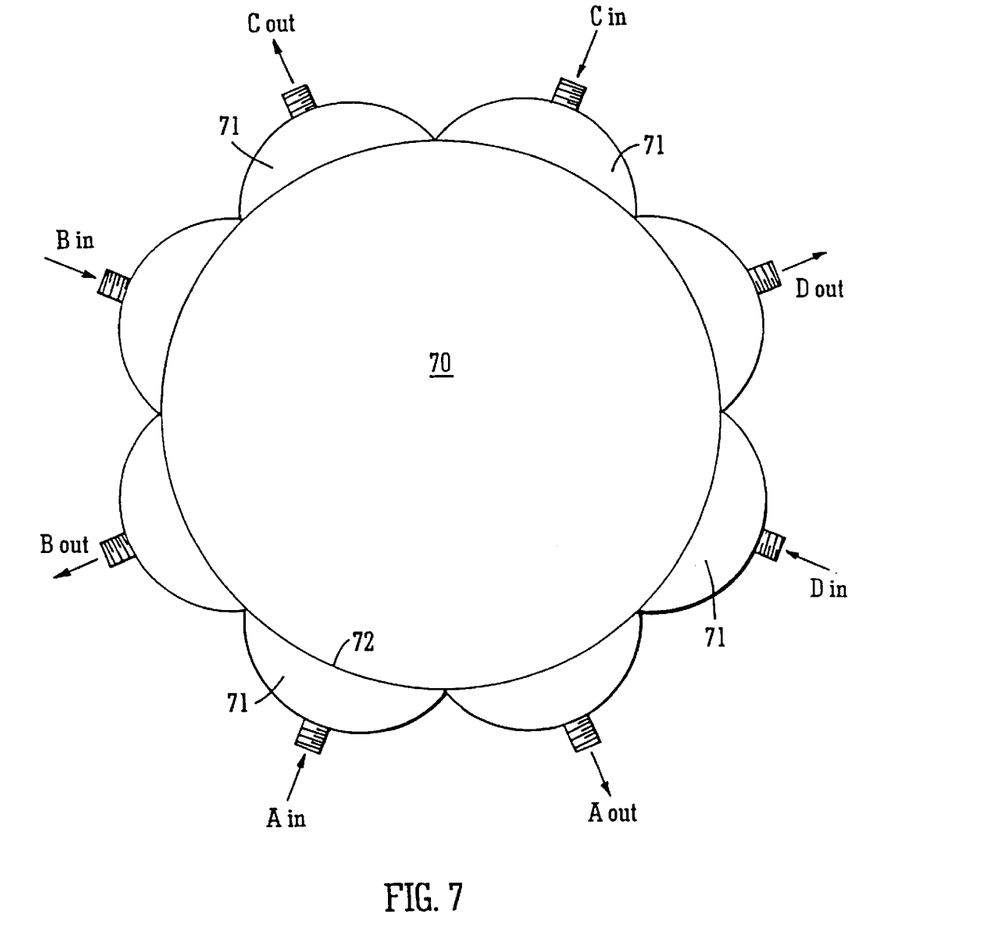
FIG. 7 is a diagrammatic illustration in plan of a circular stack of the invention which is of a four-stream eight-pass construction.
Figure 8:
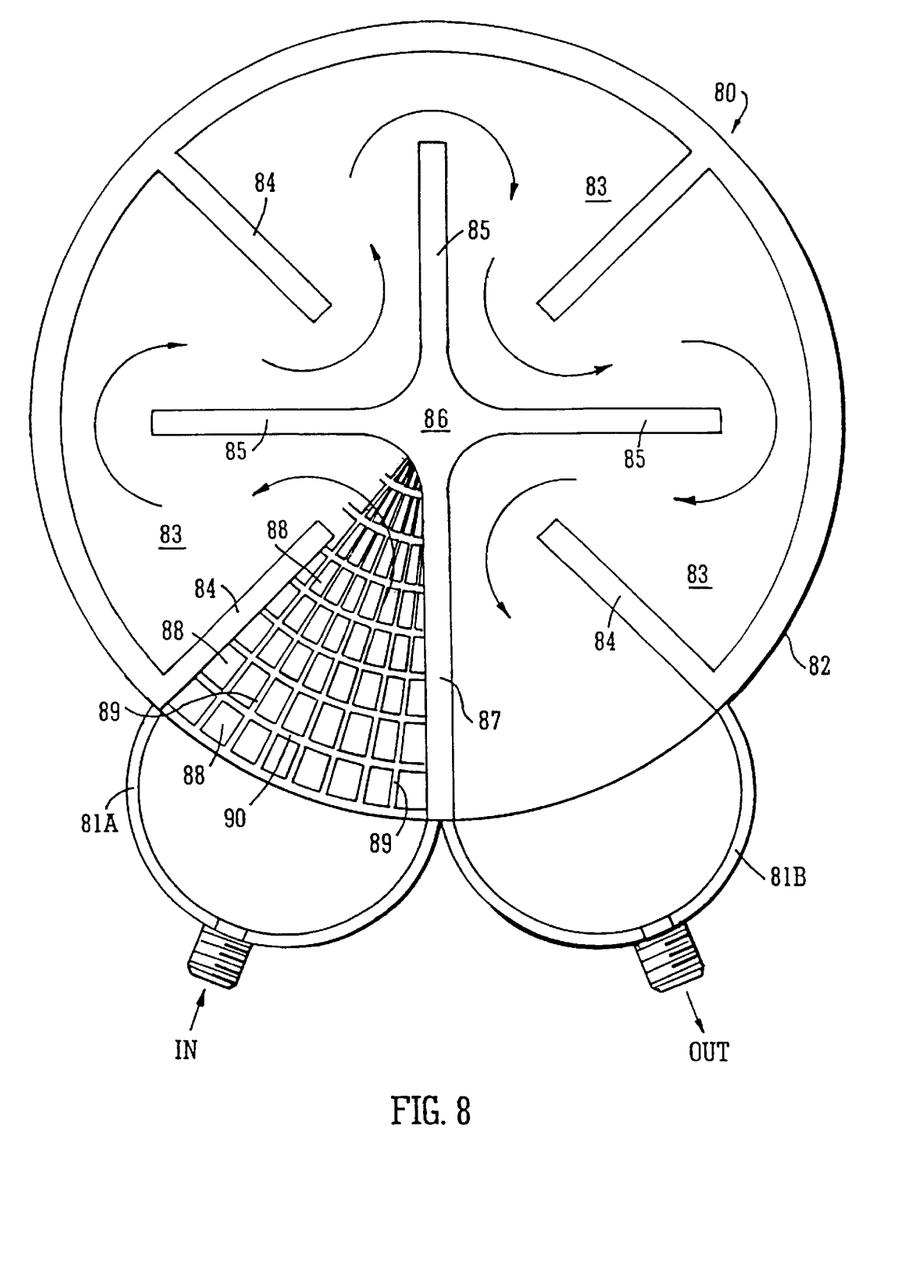
FIG. 8 is a plan view of one secondary plate of the stack of FIG. 7.

In FIGS. 7 and 8 a stack 70 of circular plates is shown. The stack has a four-stream, eight-pass construction. The four streams A, B, C, D are indicated in FIG. 7, each having an inlet, e.g. A (in) and an outlet, e.g. A (out). Each inlet and outlet is positioned in an integral tank 71. The eight tanks 71 are shown equi-spaced around the perimeter 72 of the circular stack by the superposition of loops formed on the perimeters of the individual plates. (See loops 81A and 81B in FIG. 8). However, such equi-spacing is not essential and other tank arrangements may be utilised where desired.

An individual perforated plate 80 from the stack of FIG. 7 is shown in FIG. 8. The plate has two loops 81A and 81B integrally formed on its perimeter 82 corresponding to the inlet and outlet tanks respectively for the group of plates of which plate 80 is one constituent.

The plate is divided by radial bars into eight segments 83, each segment corresponding to a loop 81. Alternate bars 84 and 85 extend inwardly from the perimeter 82 and outwardly from the centre 86 respectively, bars 84 stopping short of the centre and bars 85 stopping short of the perimeter whereby a continuous passageway 83 is provided between the segments from inlet loop 81A to the outlet loop 81B. A bar 87, which divides the segment adjacent inlet loop 81A from outlet loop 81B, extends continuously from the perimeter to the centre, thereby preventing flow between the inlet and outlet segments.

Each segment 83 of the plate contains rows of perforations 88 separated by fins 89. Transverse bars 90 separate the perforations in each row. The perforations and/or fins narrow from the perimeter to the centre.

It will be appreciated that the stack 70 is made up of four groups of plates, each containing at least two superposed plates 80, adjacent groups being separated by a solid plate. A process group of plates as opposed to a coolant group may, if desired, also contain a perforated reactant plate.

In the FIG. 7 and FIG. 8 construction, the heat transfer and/or mixing effect can be greatly varied to meet a wide range of requirements by adjusting the lengths of the radial bars and the number of rows of perforations per segment. The flow velocity v. flow channel width relationship can be adjusted to give a higher degree, of turbulence, if required for heat transfer applications.

Figure 9:
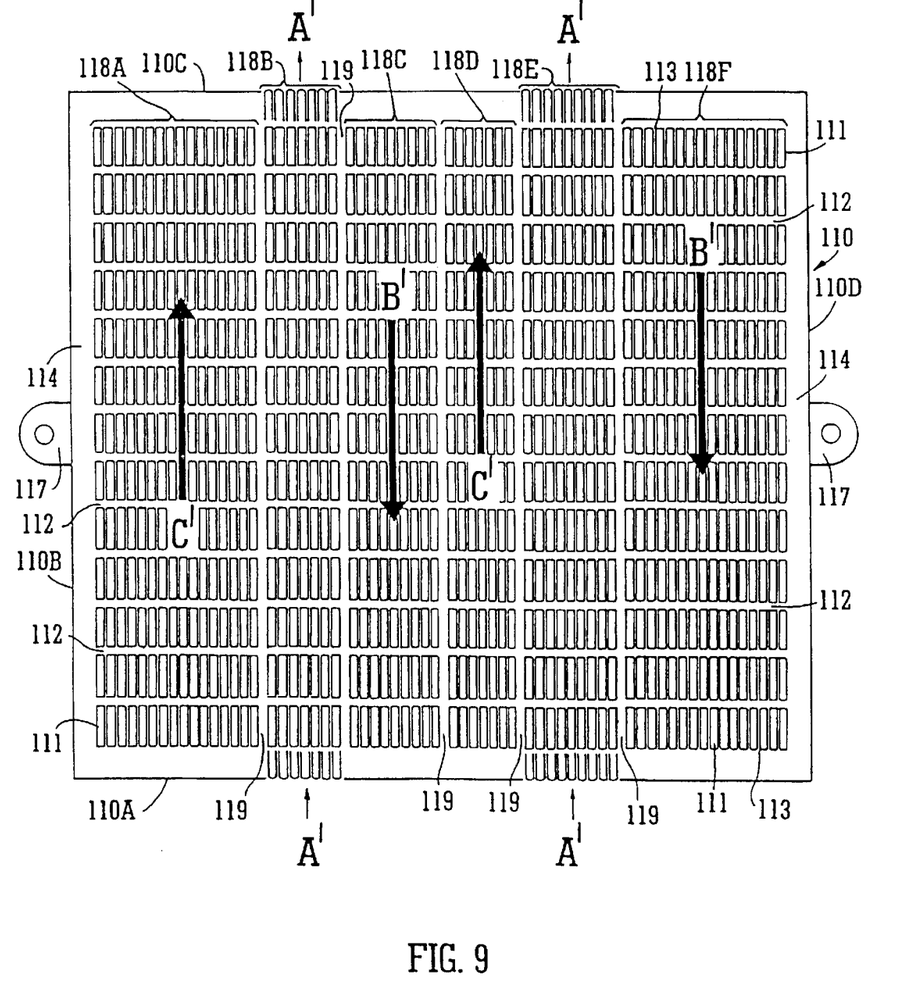
FIG. 9 is a plan view of another form of main, perforated plate for use in the invention.

In FIG. 9, a main perforated plate 110 is of rectangular shape, having four edges 110A, 110B, 110C, 110D. It has a series of perforations in the form of elongated slots 111 through its thickness. The slots 111 lie in parallel rows forming six main groups of rows 118A, 118B, 118C, 118D, 118E, 118E extending across the plate between edges 110A and 110C. As shown there are 8 to 16 rows of slots in reach group of rows but, again, it will be appreciated that more or less rows of slots per group (and more or less groups across the plate) may be employed, if desired.

Transverse bars or flow interrupters 112 separate each slot from adjacent slots in the same row. Narrow fins or ribs 113 extending in the direction of the slots separate each slot in a row from al slot in an adjacent row. Wider fins or ribs 119 separate adjacent groups of rows 118A, 118B, 118C, 118D, 118E, 118F.

An unperforated border region 114 extends along the wholes of edges 110B and 110D of the plate.

Positioning lugs 117 are integrally-formed at the mid-region of edges 110E and 110D.

As shown, the groups of rows 118A, 118C, 118D, 118E do not extend to the edges 110A and 110C of the plate whereas groups of rows 118B and 118E do extend to edges 110A and 110C, will be explained further below, groups of rows 118E and 118E will combine with corresponding rows of one or more similar adjacent stacked plates to form two passageways (see arrows A') for a first fluid through the stack. Groups of rows 118A, 118C, 118D, 118E Will combine with corresponding rows of those adjacent plates to provide transfer passageways for second and third fluids (see arrows B' and C').

When a pair of plates 110 is superposed one on the other so that they overlap by a small amount at their edges 110A (and 110C) but with their edges 110B and 110D aligned, the transverse bars 112 of one plate will be out of alignment with those of the other plate. Flow channels are, thereby, provided along the rows of slots as the transverse bars do not impede flow. Because the fins or ribs 113 and 119 of the superposed plates are aligned, each row of slots provides a discrete flow channel separated from adjacent flow channels and each group of rows 118A to 118E provides a discrete passageway separated from adjacent passageways, again as indicated by arrows A', B' and C' in FIG. 9.

Figure 10:
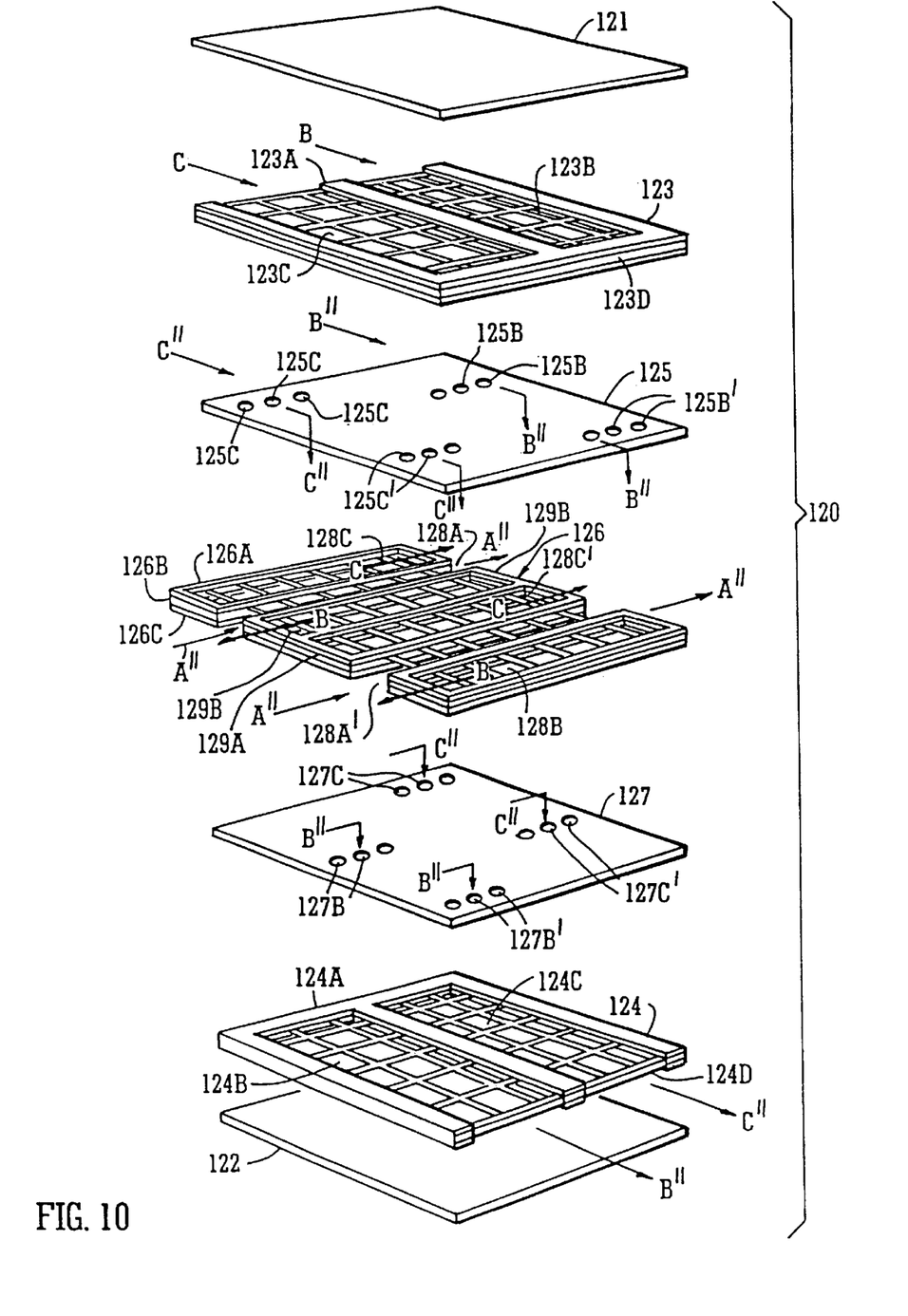
FIG. 10 is an exploded perspective view of one stack of plates according to another embodiment of the invention.

In FIG. 10 is shown an exploded stack of plates 120 comprising an upper primary, unperforated plate 121 and a lower primary unperforated plate 122. Adjacent upper plate 121 is a dual passageway input layer 123. Adjacent lower plate 122 is a dual passageway output layer 124. A first auxiliary perforated plate 125 lies between input layer 123 and a centrally-disposed multi-passageway layer 126. A second auxiliary perforated plate 127 lies between, multi-passageway layer 126 and output layer 124.

Centrally-disposed layer 126 is made up of a group of plates 126A, 126B, 126C (although it will be appreciated that fewer; or more such plates may be used), each of which may be constructed as shown in FIG. 9. Thus layer 126 has flow passageways 128C, 128A, 128B, 128C, 128A and 128B which correspond to rows 118A to 118E respectively as shown in FIG. 9. Passageways 128A and 128A' pass completely through the layer from one edge 129A to the opposite edge 129B and provide through flow for a first fluid in the direction of arrows A". Passageways 128B, 128B, 128C and 128C do not continue through edges 129A and 129B of the layer but are blocked by those edges.

Input layer 123, which again is a multi-plate layer, defines two passageways 123B and 123C for second and third fluids in the directions of arrows B" and C" respectively. The passageways inlet at edge 123A of the layer but are blocked from passing through the layer at the opposite edge 123D.

First auxiliary perforated plate 125 has series (if holes 125B and 125B and 125C and 125C through which the second and third fluids flowing across layer 123 can pass. Holes 125B and 125B are positioned to direct the second fluid into its respective flow passageways 128B and 128B and holes 125C and 125C are positioned to direct the third fluid into its respective passageways 128C and 128C of the centrally-disposed layer 126.

Output layer 124, which is again a multi-plate layer, also defines two passageways, 124B and 124C which pass to an open outlet edge 124D of the layer but are blocked at the opposite edge 124A.

Second auxiliary perforated plate 127 has a series of holes 127B, 127B; and 127C, 127C through which the second and third fluids respectively flowing across layer 126 can pass. Holes 127B and 127B direct the second fluid into passageway 124B and holes 127C and 127C direct the third fluid into passageway 124C.

Thus the construction provides a means of passing a plurality of fluids through adjacent passageways of the same layer of the stack.

It will be appreciated that the direction of flow of the fluids, the number of passageways and the number of plates in each layer of the stack can readily be varied by the skilled man of the art to meet any particular requirements.

What is claimed is:

1. A fluid flow device comprising a bonded stack of circular plates, the stack comprising at least one group of perforated main plates each group of perforated main plates comprising at least two adjacent main plates having perforations aligned in radially extending rows with radially extending ribs between adjacent rows, the rows of perforations in one main plate overlapping the rows of perforations of an adjacent main plate and the ribs of adjacent main plates lying in correspondence with each other to define discrete fluid flow channels extending radially across the plates, the channels together forming one or more radially extending fluid flow passageways, the stack further comprising one or more intervening plates disposed on one or both sides of a first group of perforated main plates.

2. A device according to claim 1, wherein a second group of perforated main plates is separated from the first group of perforated main plates by one or more intervening plates so that one or more fluid passageways in the second group of perforated main plates are separated from one or more fluid passageways in the first group of perforated main plates by one or more intervening plates to define separate passageways on each side of the one or more intervening plates.

3. A device according to claim 2, wherein each intervening plate between the first and second groups of plates is perforated to allow fluid flow from a passageway on one side of the one or more intervening plates between the first and second groups of plates into a passageway on the other side thereof.

4. A device according to claim 1 or claim 3, wherein each passageway has an inlet and an outlet, the device further comprising a respective integral tank in communication with the inlet of each passageway and a respective integral tank in communication with the outlet of each passageway.

5. A device according to claim 4, wherein each plate has a plurality of loops integrally formed on the perimeter of the plate, the loops on each plate co-operating with the loops on adjacent plates to form said integral inlet and outlet tanks.

6. A device according to claim 4, wherein each main plate has a plurality of alternate radially extending first bars that extend inwardly from a perimeter of each main plate toward the center of each main plate and a plurality of alternate radially extending second bars that extend outwardly from the center of each main plate toward the periphery of each main plate, said first bars stopping short of the center and the second bars stopping short of the perimeter, the pluralities of first and second bars being constructed and arranged to divide the continuous fluid passageway extending from the inlet to the outlet into a plurality of segments spaced circumferentially about the center of each group of main plates, each segment including one or more radially extending fluid passageways disposed between a pair of radially extending bars.

7. A device according to claim 6, wherein each group of main plates has a dividing bar that extends continuously from the center of the group of plates to the perimeter of the group of plates, the dividing bar being constructed and arranged to prevent fluid from flowing directly between a segment immediately adjacent the fluid inlet and a segment immediately adjacent the fluid outlet of each group of main plates.

8. A device according to claim 1, wherein one or more fluid passageways in the first group of main perforated plates is defined in part by an intervening plate adjacent a side of the first group of main perforated plates.

* * * * *

UNITED STATES PATENT AND TRADEMARK OFFICE
CERTIFICATE OF CORRECTION

PATENT NO. : 6,736,201 B2
DATED : May 18, 2004
INVENTOR(S) : Watton et al.

It is certified that error appears in the above-identified patent and that said Letters Patent is hereby corrected as shown below:

<u>Title page,</u>
Item [73], Assignee, "Chart Heat Exchangers Limited, Cardiff (GB)" is corrected to read -- Chart Heat Exchangers Limited Partnership, West Midlands (UK) --.

Signed and Sealed this

Twenty-eighth Day of September, 2004

JON W. DUDAS
*Director of the United States Patent and Trademark Office*